(12) United States Patent
Noro et al.

(10) Patent No.: US 6,590,016 B2
(45) Date of Patent: Jul. 8, 2003

(54) FLAME RETARDANT THERMOPLASTIC RESIN COMPOSITION

(75) Inventors: Masahiko Noro, Tokyo (JP); Hiroyuki Itoh, Tokyo (JP); Keigo Higaki, Tokyo (JP); Hiroaki Miyazaki, Tokyo (JP)

(73) Assignee: Techno Polymer Co., Ltd., Tokyo (JP)

( * ) Notice: Subject to any disclaimer, the term of this patent is extended or adjusted under 35 U.S.C. 154(b) by 29 days.

(21) Appl. No.: 09/789,533

(22) Filed: Feb. 22, 2001

(65) Prior Publication Data

US 2001/0056140 A1 Dec. 27, 2001

(30) Foreign Application Priority Data

Feb. 24, 2000 (JP) .......................................... 2000-047118

(51) Int. Cl.$^7$ ........................... C08L 69/00; C08K 5/523
(52) U.S. Cl. ........................ 524/127; 524/141; 524/310; 525/67
(58) Field of Search ................................. 524/127, 141, 524/310; 525/67

(56) References Cited

U.S. PATENT DOCUMENTS 4,048,271 A * 9/1977 Kesting
5,367,021 A * 11/1994 Roovers et al.
5,719,209 A * 2/1998 Miller et al.

FOREIGN PATENT DOCUMENTS

| CA | 2300216 | * 2/1999 |
| JP | 07-011119 | * 1/1995 |

* cited by examiner

Primary Examiner—David J. Buttner
(74) Attorney, Agent, or Firm—Nixon & Vanderhye P.C.

(57) ABSTRACT

Flame retardant thermoplastic resin compositions containing (A) a rubber-reinforced resin produced by graft-polymerizing a monomer component containing an aromatic vinyl compound and a vinyl cyanide compound as main ingredients in the presence of a rubber polymer particles and (B) 90 to 60 parts by weight of an aromatic polycarbonate. Optionally (C) a phosphate compound and (D) a component containing poly-tetrafluoroethylene and a lubricant may be present.

9 Claims, No Drawings

FLAME RETARDANT THERMOPLASTIC RESIN COMPOSITION

BACKGROUND OF THE INVENTION

The present invention relates to a flame retardant resin composition, and more particularly, it relates to a non-halogen-based flame retardant thermoplastic resin composition which is excellent in impact resistance, heat resistance, fluidity, flame retardance and extrusion-production stability.

Conventionally, flame retardant ABS resins have been extensively used in various applications such as electric and electronic devices and office automation devices because these resins are excellent in appearance of molded products produced therefrom, moldability, mechanical properties or the like. In recent years, there is a tendency that the use of halogen-based flame retardants in these products should be avoided from the viewpoint of environmental protection. For this reason, there have been presently marketed such flame retardant resin materials containing a PC (polycarbonate)/ABS alloy resin as a base resin and a phosphate-based flame retardant.

However, in the case where the PC/ABS alloy resin is used in combination with the phosphate-based flame retardant, the obtained materials tend to show a poor extrusion-production stability, and also tends to be deteriorated in chemical resistance.

In the case where such a polycarbonate resin having a low molecular weight is used in combination with the phosphate-based flame retardant to enhance extrusion stability, the obtained composition is deteriorated in impact resistance in spite of the enhanced extrusion stability. Further, such a composition generally contains polytetrafluoroethylene as an anti-dripping agent. However, since the polytetrafluoroethylene usually has a molecular weight as high as not less than 1,000,000, it becomes difficult to uniformly disperse the polytetrafluoroethylene in the resin, so that the obtained composition has problems such as deteriorated impact resistance and unstable production of strands when pelletized by an extruder.

As a result of the present inventors' earnest studies to solve the above problems, it has been found that the problems can be solved by using a specific rubber-reinforced thermoplastic resin, a specific aromatic polycarbonate, a specific phosphate-based flame retardant and specific additives in combination. The present invention has been attained on the basis of this finding.

SUMMARY OF THE INVENTION

An object of the present invention is to provide a non-halogen-based flame retardant thermoplastic resin composition which is free from the above problems and excellent in impact resistance, heat resistance, fluidity, flame retardance and extrusion-production stability.

To attain the above aim, in accordance with the present invention, there is provided a flame retardant thermoplastic resin composition comprising:

(A) 10 to 40 parts by weight of a rubber-reinforced resin produced by graft-polymerizing a monomer component containing an aromatic vinyl compound and a vinyl cyanide compound as main ingredients in the presence of a rubber polymer comprising particles having a particle size of not more than 150 nm in an amount of 0 to 15% by weight, particles having a particle size of from more than 150 to less than 350 nm in an amount of 60 to 100% by weight and particles having a particle size of not less than 350 nm in an amount of 0 to 25% by weight; and (B) 90 to 60 parts by weight of an aromatic polycarbonate having a viscosity-average molecular weight of 16,000 to 30,000, with the proviso that the total amount of the components (A) and (B) is 100 parts by weight;

said composition further comprising:

(C) a phosphate compound represented by the general formula (I):

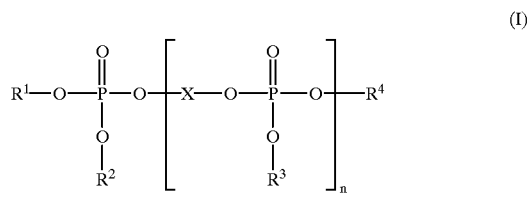

wherein $R^1$, $R^2$, $R^3$ and $R^4$ are independently phenyl group or xylenyl group; X is m-phenylene group or 2,2-bis(4'-phenylene)propane group; and n is 0.5 to 1.2, in an amount of 8 to 25 parts by weight based on 100 parts by weight of the sum of said components (A) and (B); and (D) a component comprising 10 to 70% by weight of polytetrafluoroethylene (d1) and 90 to 30% by weight of a lubricant (d2) with the proviso that the total amount of (d1) and (d2) is 100% by weight, in an amount of 0.1 to 10 parts by weight based on 100 parts by weight of the sum of said components (A) and (B).

DETAILED DESCRIPTION OF THE INVENTION

The rubber-reinforced resin (A) used in the present invention may be produced by graft-polymerizing a monomer component containing an aromatic vinyl compound and a vinyl cyanide compound as main ingredients in the presence of a rubber polymer having a specific particle size distribution.

Meanwhile, the rubber-reinforced resin (A) used in the present invention may be in the form of a mixture obtained by blending the graft copolymer produced by the above graft polymerization, with a separately produced polymer or copolymer of at least one monomer component selected from the group consisting of the above aromatic vinyl compounds and vinyl cyanide compounds.

As the rubber polymers, there may be exemplified polybutadiene, styrene-butadiene copolymers, styrene-isoprene copolymers, butadiene-acrylonitrile copolymers, ethylene-propylene or ethylene-propylene-non-conjugated diene copolymers, ethylene-butene-1 or ethylene-butene-1-non-conjugated diene copolymers, isobutylene-isoprene copolymers, acrylic rubbers, styrene-butadiene-styrene block copolymers, styrene-isoprene-styrene block copolymers, polyurethane rubbers, silicone rubbers or the like. Specific examples of the styrene-butadiene copolymers may include styrene-butadiene random copolymers, styrene-butadiene block copolymers or the like. In addition, hydrogenated products of the above-described polybutadiene, styrene-butadiene copolymers or the like may also be used as the rubber polymers. These rubber polymers may be used alone or in the form of a mixture of any two or more thereof. Among these rubber polymers, polybutadiene, styrene-butadiene copolymers, ethylene-propylene or ethylenepropylene-non-conjugated diene copolymers, hydrogenated diene-based polymers or copolymers and silicone rubbers are preferred.

In the present invention, the particle size distribution of the rubber polymer is very important. The rubber polymer is required to have the following particle size distribution. Namely, the rubber polymer contains particles having a particle size of 50 to 150 nm in an amount of 0 to 15% by weight, preferably 0 to 12% by weight; particles having a particle size of from more than 150 to less than 350 nm in an amount of 60 to 100% by weight, preferably not less than 65 to 100% by weight; and particles having a particle size of 350 to 2000 nm in an amount of 0 to 25% by weight, preferably 0 to 20% by weight.

When the particle size distribution of the rubber polymer which largely influences the rubber orientation upon molding, lies within the above-specified range, the obtained composition can exhibit a good practical impact resistance. Here, the "rubber orientation" means such a phenomenon that rubber particles are deformed in the flowing direction by shear force applied upon melding. When the rubber orientation is increased, the practical impact resistance of the composition becomes deteriorated.

When the content of the rubber polymer particles having a particle size of not more than 150 nm is exceeds 15% by weight, the stress distribution effect by rubber particles within the molded product may be deteriorated, resulting in poor practical impact resistance thereof. When the content of the rubber polymer particles having a particle size of not less than 350 nm exceeds 25% by weight, the rubber orientation becomes considerably large, resulting in poor practical impact resistance and deterioration in burning evaluation rating (flame retardance).

The rubber polymer has a gel fraction of preferably 40 to 90% by weight, more preferably 50 to 90% by weight, especially preferably 60 to 90% by weight. When the gel fraction of the rubber polymer is less than 40% by weight, the obtained composition may be deteriorated in impact resistance, stiffness, flame retardance and the like. On the contrary, when the gel fraction of the rubber polymer is more than 90% by weight, the obtained molded product may be also deteriorated in impact resistance and flowability.

Meanwhile, the gel fraction (toluene-insoluble content) of the rubber polymer is determined as follow. One gram of the rubber polymer is added to 100 ml of toluene. The resultant mixture is allowed to stand at room temperature for 48 hours, and then filtered through a 100-mesh metal screen. The thus separated filtrate is dried to remove toluene therefrom, thereby obtaining a toluene-soluble content (g). From the toluene-soluble content (g), the gel fraction of the rubber polymer is calculated according to the following formula:

$$\text{Gel Fraction (\%)} = \{1(g) - \text{toluene-soluble content (g)}\} \times 100$$

The amount of the rubber polymer contained in the above rubber-reinforced resin (A) is in the range of preferably 10 to 60% by weight, more preferably 20 to 50% by weight, especially preferably 25 to 45% by weight. When the content of the rubber polymer in the component (A) is not less than 10% by weight, the obtained composition is excellent especially in impact resistance. Also, when the content of the rubber polymer in the component (A) is not more than 60% by weight, the obtained composition is excellent especially in fluidity and burning evaluation rating. When the content of the rubber polymer in the component (A) is too small, the obtained composition may be deteriorated in impact resistance. On the contrary, when the content of the rubber polymer in the component (A) is too large, the obtained composition may be deteriorated in fluidity and flame retardance.

Examples of the aromatic vinyl compounds used in the monomer component graft-polymerized in the component (A) may include styrene, α-methyl styrene, o-methyl styrene, p-methyl styrene, tert-butyl styrene, vinyl toluene, methyl-α-methyl styrene, divinyl benzene, 1,1-diphenyl styrene, N,N-diethyl-p-aminoethyl styrene, N,N-diethyl-p-aminomethyl styrene, vinyl pyridine, vinyl xylene or the like. Among these aromatic vinyl compounds, styrene and α-methyl styrene are especially preferred.

In particular, when the α-methyl styrene is used in the monomer component in an amount of 10 to 50% by weight, preferably 20 to 30% by weight, it is possible to impart an excellent heat resistance to the flame retardant thermoplastic resin composition of the present invention.

The amount of the aromatic vinyl compound copolymerized in the component (A) is preferably 30 to 70% by weight, more preferably 40 to 70% by weight, especially preferably 45 to 70% by weight based on the weight of the component (A).

As the vinyl cyanide compounds used in the monomer component, there may be exemplified acrylonitrile, methacrylonitrile or the like. Among these vinyl cyanide compounds, acrylonitrile is preferred.

The amount of the vinyl cyanide compound copolymerized in the component (A) is preferably 5 to 40% by weight, more preferably 10 to 35% by weight, especially preferably 10 to 30% by weight based on the weight of the component (A).

When the content of the aromatic vinyl compound is too large or the content of the vinyl cyanide compound is too small, the obtained composition may be deteriorated in chemical resistance, flame retardance or the like. On the other hand, when the content of the aromatic vinyl compound is too small or the content of the vinyl cyanide compound is too large, the obtained composition may be deteriorated in fluidity, impact resistance or the like.

The monomer component may further contain the other copolymerizable monomers, if required. Examples of the other copolymerizable monomers may include unsaturated acid anhydrides, unsaturated acids, imide compounds of unsaturated dicarboxylic acids or the like.

Examples of the unsaturated acid anhydrides may include maleic anhydride, itaconic anhydride, citraconic anhydride or the like. Among these unsaturated acid anhydrides, maleic anhydride is preferred.

Examples of the unsaturated acids may include acrylic acid, methacrylic acid or the like.

Examples of the imide compounds of unsaturated dicarboxylic acids may include maleimide, N-methyl maleimide, N-butyl maleimide, N-phenyl maleimide, N-(2-methylphenyl) maleimide, N-(4-hydroxylphenyl) maleimide, N-cyclohexyl maleimide or the like. Among these imide compounds, N-phenyl maleimide is preferred.

These respective monomer components used in the component (A) may be used alone or in the form of a mixture of any two or more thereof.

Further, the component (A) may contain a functional group-containing vinyl monomer, if required.

Examples of the functional group-containing vinyl monomers may include epoxy-containing unsaturated compounds such as glycidyl acrylate, glycidyl methacrylate and allyl glycidyl ethers; hydroxy-containing unsaturated compounds such as 3-hydroxy-1-propene, 4-hydroxy-1-butene, cis-4- hydroxy-2-butene, trans-4-hydroxy-2-butene, 3-hydroxy-2-methyl-1-propene, 2-hydroxyethyl acrylate, 2-hydroxyethyl methacrylate and hydroxystyrene; unsaturated carboxylic acid amides such as acrylamide and methacylamide; amino-containing unsaturated compounds such as acrylamine, aminomethyl methacrylate, methacrylic acid amino ethers, aminopropyl methacrylate and aminostyrene; unsaturated acids such as acrylic acid and methacrylic acid; oxazoline-containing unsaturated compounds such as vinyl oxazoline; or the like. These functional group-containing vinyl monomers may be used alone or in the form of a mixture of any two or more thereof. When such a functional group-containing monomer is copolymerized with the component (A), it is possible to enhance an interfacial adhesion property (compatibility) to the other resin blended therewith.

The graft percentage of the rubber-reinforced resin (A) is preferably 60 to 120%, more preferably 60 to 90%.

Here, the graft percentage (%) means the amount of the monomer component grafted to the rubber polymer, and is expressed by the value obtained according to the following method. Namely, the graft percentage is the value calculated according to the following formula:

Graft percentage (%)={(y−x)/x}×100 wherein x is a weight of rubber component contained in acetone-insoluble component of the rubber-reinforced resin, which can be determined from a calibration curve previously prepared, for example, using an absorbance ratio of a trans-double bond out-of-plane C—H bending vibration at 967 cm$^{-1}$ by infrared spectroscopic analysis in the case where the rubber component is polybutadiene; and y is a weight of the acetone-insoluble component.

Here, the acetone-insoluble component is obtained by shaking 1 g of the rubber-reinforced resin in 50 ml of acetone at room temperature for 24 hours using a shaker to dissolve liberated polymers or copolymers in acetone, subjecting the resultant mixture to centrifugal separation and then vacuum-drying the thus-separated acetone-insoluble component at 120° C. for one hour.

When the graft percentage is too small, the obtained flame retardant thermoplastic resin composition may be deteriorated in impact resistance and flame retardance. On the other hand, when the graft percentage is too large, the obtained composition may be deteriorated in fluidity. Therefore, when the graft percentage of the rubber-reinforced resin (A) is in the above range of 60 to 120%, the obtained composition is excellent in impact resistance, fluidity and flame retardance.

The methyl ethyl ketone-soluble component as a matrix component of the rubber-reinforced resin (A) used in the present invention has an intrinsic viscosity [η] of preferably 0.2 to 1.2 dl/g, more preferably 0.2 to 1 dl/g, especially preferably 0.3 to 1 dl/g when measured at 30° C. in methyl ethyl ketone. When the intrinsic viscosity lies within the above-specified range, it is possible to obtain a flame retardant thermoplastic resin composition according to the present invention which is excellent especially in impact resistance, heat resistance and fluidity.

Meanwhile, the above graft percentage (%) and intrinsic viscosity [η] can be readily controlled by varying kinds and amounts of polymerization initiator, chain transfer agent, emulsifier, solvent, etc. which are used upon the polymerization of the rubber-reinforced resin as well as the polymerization time and temperature.

The rubber-reinforced resin used in the present invention can be produced by subjecting the monomer component containing the aromatic vinyl compound and the vinyl cyanide compound as main ingredients to radical graft polymerization in the presence of the rubber polymer by known methods such as emulsion polymerization method, solution polymerization method, bulk polymerization method and suspension polymerization method. In the emulsion polymerization, there may be used polymerization initiator, chain transfer agent (molecular weight-controlling agent), emulsifier, water or the like.

Meanwhile, upon the production of the rubber-reinforced resin, the monomer component may be added either at one batch, in parts or continuously in the presence of a whole amount of the rubber polymer. Also, the polymerization may be conducted by the combination of these methods. Further, the whole or part of the rubber polymer may be added in the course of the polymerization process.

As the polymerization initiators, there may be used redox-type polymerization initiators prepared by combining organohydroperoxides such as typically cumene hydroperoxide, diisopropylbenzene hydroperoxide and p-menthane hydroperoxide with a reducing agent such as typically sugar-containing pyrophosphoric acid formulation and sulfoxylate formulation; persulfates such as potassium persulfate; azobisisobutyronitrile (AIBN); and organic peroxides such as benzoyl peroxide (BPO), lauroyl peroxide, tert-butyl peroxylaurate and tert-butyl peroxymonocarbonate. Further, the polymerization initiators may be added either at one batch or continuously to the polymerization system. The amount of the polymerization initiators used is usually 0.1 to 1.5% by weight, preferably 0.2 to 0.7% by weight based on the weight of the monomer component.

In the present invention, conventional known chain transfer agents may be used. Specific examples of the chain transfer agents may include mercaptans such as octyl mercaptan, n-dodecyl mercaptan, tert-dodecyl mercaptan, n-hexyl mercaptan, n-hexadecyl mercaptan, n-tetradecyl mercaptan and tert-tetradecyl mercaptan; tetraethyl thiuram sulfide; carbon tetrachloride; ethylene bromide; pentaphenyl ethane; terpenes; dimers of acrolein, methacrolein, allyl alcohol, 2-ethylhexyl thioglycol or i-methyl styrene; or the like. These chain transfer agents may be used alone or in the form of a mixture of any two or more thereof. The amount of the chain transfer agent used is usually 0.05 to 2% by weight based on the weight of the monomer component.

The emulsifiers usable in the emulsion polymerization may be conventional known ones. Specific examples of the emulsifiers may include sulfates of higher alcohols; alkylbenzene sulfonates such as sodium dodecylbenzene sulfonate; aliphatic sulfonates such as sodium lauryl sulfate; higher aliphatic carboxylic acid salts, anionic surfactants such as phosphoric acid-based surfactants; and nonionic surfactants such as alkyl esters or alkyl ethers of polyethylene glycols. These emulsifiers may be used alone or in the form of a mixture of any two or more thereof. The amount of the emulsifier used is usually 0.3 to 5% by weight based on the weight of the monomer component.

When the rubber-reinforced resin is produced by emulsion polymerization, the obtained rubber-reinforced resin may be usually purified by washing a resin powder obtained by the coagulation process using a coagulant, with water and then drying the resin powder. As the coagulants, there may be used inorganic salts such as calcium chloride, magnesium sulfate, magnesium chloride and sodium chloride, and acids such as sulfuric acid and hydrochloric acid.

Meanwhile, the rubber-reinforced resin (A) used in the present invention may further contain, if required, a polymer or copolymer of at least one monomer component selected from the group consisting of the above-described monomer components. The monomer component of the polymer or copolymer may be the same as or different from those used in the graft polymerization. Also, these polymers or copolymers may be used alone or in combination.

The above polymers or copolymers can be produced, for example, by the same polymerization methods as described above.

The methyl ethyl ketone-soluble component of the above polymers or copolymers has an intrinsic viscosity [η] of preferably 0.2 to 1 dl/g, more preferably 0.3 to 1 dl/g, especially preferably 0.3 to 0.8 dl/g when measured at 30° C. in methyl ethyl ketone. When the intrinsic viscosity [η] lies in the above-specified range, it is possible to obtain a resin composition having excellent impact resistance, heat resistance and fluidity. The intrinsic viscosity [η] of the methyl ethyl ketone-soluble component contained in the polymers or copolymers can be controlled by the same method as described above.

Typical examples of the rubber-reinforced resin (A) may include the following resins, though not limited thereto.

(1) Acrylonitrile-butadiene-styrene resin; and (2) Methyl methacrylate-butadiene-styrene resin.

The amount of the component (A) blended is 10 to 40 parts by weight, preferably 10 to 30 parts by weight, more preferably 15 to 30 parts by weight based on 100 parts by weight of the sum of the components (A) and (B). When the amount of the component (A) blended is less than 10 parts by weight, the obtained composition may be deteriorated in fluidity. On the other hand, when the amount of the component (A) blended exceeds 40 parts by weight, the obtained composition may be deteriorated in burning evaluation rating.

In the flame retardant thermoplastic resin composition of the present invention, as the aromatic polycarbonate resin (B) having a viscosity-average molecular weight of 16,000 to 30,000, there may be used various resins produced by the reaction between a dihydroxyaryl compound and phosgene (phosgene method), or by the transesterification reaction between the dihydroxyaryl compound and diphenyl carbonate (transesterification method).

Examples of the dihydroxyaryl compounds as raw materials of the polycarbonates may include bis(4-hydroxyphenyl)methane, 1,1'-bis(4-hydroxyphenyl)ethane, 2,2'-bis(4-hydroxyphenyl)propane, 2,2'-bis(4-hydroxyphenyl)butane, 2,2'-bis(4-hydroxyphenyl)octane, 2,2'-bis(4-hydroxyphenyl)phenylmethane, 2,2'-bis(4-hydroxy-3-methylphenyl)propane, 2,2'-bis(4-hydroxy-3-tert-butylphenyl)propane, 2,2'-bis(4-hydroxy-3-bromophenyl)propane, 2,2'-bis(4-hydroxy-3,5-dichlorophenyl)propane, 1,1'-bis(4-hydroxyphenyl) cyclopentane, 1,1'-bis(4-hydroxyphenyl)cyclohexane, 4,4'-dihydroxydiphenyl ether, 4,4'-dihydroxy-3,3'-dimethyldiphenyl ether, 4,4'-dihydroxyphenyl sulfide, 4,4'-dihydroxyphenyl sulfide, 4,4'-dihydroxy-3,3'-dimethylphenyl sulfide, 4,4'-dihydroxydiphenyl sulfoxide, 4,4'-dihydroxyphenyl sulfoxide, 4,4'-dihydroxy-3,3'-dimethyldiphenyl sulfoxide, 4,4'-dihydroxydiphenyl sulfone, 4,4'-dihydroxy-3,3'-dimethyldiphenyl sulfone, hydroquinone, resorcin or the like. These dihydroxyaryl compounds may be used alone or in the form of a mixture of any two or more thereof. Among these dihydroxyaryl compounds, the use of 2,2'-bis(4-hydroxyphenyl) propane, i.e., bisphenol A, is preferred. One typical example of the aromatic polycarbonate resin is polycarbonate obtained by reacting bisphenol A with phosgene.

The viscosity-average molecular weight of the aromatic polycarbonate (B) is 16,000 to 30,000, preferably 17,000 to 28,000, more preferably 18,000 to 26,000. When the viscosity-average molecular weight of the aromatic polycarbonate (B) is less than 16,000, the obtained composition may be deteriorated in flame retardance and impact resistance. On the other hand, when the viscosity-average molecular weight of the aromatic polycarbonate (B) exceeds 30,000, the obtained composition may be deteriorated in fluidity. In the present invention, there may also be used two or more kinds of aromatic polycarbonates having different molecular weights.

The amount of the component (B) blended is 90 to 60 parts by weight, preferably 90 to 70 parts by weight, more preferably 85 to 70 parts by weight based on 100 parts by weight of the sum of the components (A) and (B). When the amount of the component (B) blended is less than 60 parts by weight, the obtained composition may be deteriorated in burning evaluation rating. On the other hand, when the amount of the component (B) blended exceeds 90 parts by weight, the obtained composition may be deteriorated in fluidity.

As the phosphate compound (C), there may be used those represented by the following general formula (I). These phosphate compounds may be used alone or in the form of a mixture of any two or more different kinds thereof.

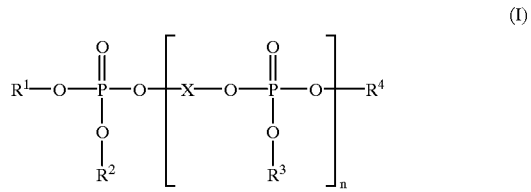

(I)

In the general formula (I), $R^1$ to $R^4$ individually represent phenyl or xylenyl. The hydrogen atoms bonded to an aromatic ring of the phenyl group may be substituted with alkyl or the like. Also, X represents a divalent organic group derived from a dihydroxy compound such as resorcinol or bisphenol A, namely m-phenylene or 2,2-bis(4'-phenylene) propane. In the general formula (I), it is preferred that all of $R^1$ to $R^4$ are xylenyl, and X is m-phenylene.

In the present invention, when two or more phosphate compounds (C) are used in the form of a mixture, the value of "n" in the general formula (I) represents an average value (average polymerization degree) of "n"s of respective condensed phosphoric acid esters in the mixture. The average polymerization degree "n" is 0.5 to 1.2, preferably 0.7 to 1.2, more preferably 0.9 to 1.1. When the average polymerization degree "n" is less than 0.5, the obtained composition may be deteriorated in heat resistance, so that a mold used tends to be contaminated or a molded product produced therefrom tends to suffer from appearance defects such as silver streaks. On the other hand, since such phosphate compounds having an average polymerization degree "n" of more than 1.2 may be difficult to produce, the use thereof results in increased cost and uneconomical process.

The amount of the phosphate compound (C) blended is 8 to 25 parts by weight, preferably 10 to 20 parts by weight, more preferably 10 to 15 parts by weight based on 100 parts by weight of the sum of the components (A) and (B). When the amount of the phosphate compound (C) blended is less than 8 parts by weight, the obtained composition may be insufficient in fluidity and flame retardance. On the other hand, when the amount of the phosphate compound (C) blended exceeds 25 parts by weight, the obtained composition may be deteriorated in heat resistance and impact resistance.

The component (D) used in the present invention is a composition containing polytetrafluoroethylene (d1) and a lubricant (d2) in amounts of 10 to 70% by weight and 90 to 30% by weight, respectively, with the proviso that the total amount of the components (d1) and (d2) is 100% by weight.

The polytetrafluoroethylene (d1) is used as an anti-dripping agent upon burning, and may be in the form of a high-molecular weight compound having a number-average molecular weight of preferably 1,000,000 to 10,000,000, more preferably 1,500,000 to 9,000,000. When the number-average molecular weight of the polytetrafluoroethylene (d1) is less than 1,000,000, the obtained composition tends to be deteriorated in anti-dripping property.

The polytetrafluoroethylene (d1) has an average particle size of preferably 100 to 700 μm, more preferably 100 to 600 μm. When the average particle size of the polytetrafluoroethylene (d1) is too small, such particles may be difficult to handle. On the other hand, when the average particle size of the polytetrafluoroethylene (d1) is too large, the anti-dripping property tends to be deteriorated.

As to the particle size distribution of the polytetrafluoroethylene (d1), the content of 600 μm or larger particles therein is preferably not more than 30% by weight, more preferably not more than 25% by weight. When the content of 600 μm or larger particles is too large, the obtained composition may be deteriorated in flame retardance and impact resistance.

Also, the polytetrafluoroethylene (d1) has a bulk density of preferably 100 to 1,000 g/l, more preferably 300 to 900 g/l. When the bulk density of the polytetrafluoroethylene (d1) is too small or too large, the dispersing condition of the polytetrafluoroethylene (d1) in the composition becomes poor, thereby causing such a tendency that the obtained composition may be deteriorated in flame retardance and impact resistance.

The polytetrafluoroethylene (d1) has a melting point of preferably 250 to 350° C., more preferably 300 to 340° C. When the melting point of the polytetrafluoroethylene (d1) is too low or too high, the obtained composition tends to be deteriorated in anti-dripping property.

Further, the polytetrafluoroethylene (d1) has a specific gravity of preferably 1.8 to 2.5, more preferably 2 to 2.4. When the specific gravity of the polytetrafluoroethylene (d1) is too small, the obtained composition may be deteriorated in anti-dripping property. On the other hand, when the specific gravity of the polytetrafluoroethylene (d1) is too large, the obtained composition may be deteriorated in anti-dripping property because it is required to blend a relatively large amount of the component (d1) in the composition.

The polytetrafluoroethylene (d1) may be produced by emulsion polymerization method, suspension polymerization method or the like.

The lubricant (d2) is used to enhance a dispersibility of the polytetrafluoroethylene (d1) in the composition. Specific examples of the lubricants (d2) may include (1) hydrocarbons such as liquid paraffin, paraffin waxes, micro waxes and polyethylene waxes; (2) aliphatic compounds or higher alcohols such as stearic acid, behenic acid and 12-hydroxystearic acid; (3) esters such as butyl stearate, stearic acid monoglyceride, fatty acid esters of polyols such as pentaerythritol, e.g., pentaerythritol tetrastearate, glycerides such as hardened castor oil waxes and hardened soybean oil waxes, and monovalent fatty acid esters such as stearyl stearate; and (4) higher alcohols such as stearyl alcohol. Among these lubricants, the ester-based lubricants, e.g., glycerides such as hardened castor oil waxes and hardened soybean oil waxes, fatty acid esters of polyols such as pentaerythritol or monovalent fatty acid esters such as stearyl stearate are preferred. The melting point of the lubricant (d2) is preferably not less than 40° C., for example, in the range of 40 to 150° C. The lubricant (d2) having a melting point of less than 40° C. is liquid at ordinary temperature. Therefore, in such a case, it is difficult to uniformly disperse the lubricant in the resin composition. These lubricants (d2) may be used alone or in the form of a mixture of any two or more thereof. Further, the lubricant (d2) may be used together with the other kind of lubricant such as silicone oil.

The blending ratio (d1)/(d2) of the polytetrafluoroethylene (d1) to the lubricant (d2) is 10 to 70/90 to 30 (wt. %), preferably 30 to 70/70 to 30 (wt. %), more preferably 40 to 70/60 to 30 (wt. %), with the proviso that the total amount of the components (d1) and (d2) is 100% by weight.

When the amount of the lubricant (d2) blended is too small, the dispersibility of the polytetrafluoroethylene (d1) in the composition may not be appropriately improved, so that the total amount of the component (D) required to exhibit a good anti-dripping property necessarily becomes increased, resulting in a too large amount of the polytetrafluoroethylene (d1) blended. In the case where such a too large amount of the polytetrafluoroethylene (d1) is blended, it may be impossible to obtain the aimed composition having an improved impact resistance and a good production stability upon extrusion.

In the composition of the present invention, the component (D) is preferably used in the form of a mixture obtained by previously blending the polytetrafluoroethylene (d1) with the lubricant (d2), in order to enhance impact resistance, flame retardance and extrusion-production stability thereof. Alternatively, the polytetrafluoroethylene (d1) and the lubricant (d2) may be separately added without mixing, to the flame retardant thermoplastic resin composition of the present invention. When the component (D) is used in the form of a mixture of the components (d1) and (d2), it is required to blend the polytetrafluoroethylene (d1) with the lubricant (d2) at a high speed, for example, using Henschel mixer or Super mixer.

The amount of the component (D) blended is 0.1 to 10 parts by weight, preferably 0.1 to 3 parts by weight, more preferably 0.1 to 2 parts by weight based on 100 parts by weight of the sum of the components (A) and (B). When the amount of the component (D) blended is less than 0.1 part by weight, the obtained composition may be deteriorated in anti-dripping property. On the other hand, when the amount of the component (D) blended exceeds 10 parts by weight, the obtained composition may be deteriorated in impact resistance and fluidity.

Further, the flame retardant thermoplastic resin composition of the present invention may also contain a component composed of organic acids and/or oligomers (hereinafter referred to merely as "component (E)"). The content of the component (E) is preferably not more than 3 parts by weight, more preferably not more than 2.5 parts by weight, especially preferably not more than 2 parts by weight based on 100 parts by weight of the sum of the components (A) and (B). When the content of the component (E) is not more than 3 parts by weight, the molding surface of mold used therefor undergoes less contamination upon molding, so that the frequency of cleaning the mold can be lessened. This enables the molding process to be continuously conducted for a longer period of time. The contents of the organic acids and oligomers are determined by the measurement method as described in Examples below.

The organic acids may be those liberated from the emulsifier used upon the production of the component (A) by the interaction with the coagulating agent (strong acids such as sulfuric acid and hydrochloric acid) which is also used upon the production of the component (A); those contained in the raw materials; and those used as stabilizers or lubricants. As such organic acids, there may be exemplified oleic acid, stearic acid, rosin acids or the like.

In order to control the content of the organic acids to the above-specified preferred range, there may be used a method of conducting the coagulation step for recovering a powder of the component (A) from a latex thereof obtained by the emulsion polymerization process, in the presence of inorganic salts such as magnesium chloride, magnesium sulfate and calcium chloride; or a method of washing the powder of the component (A) having a high organic acid content with alkalis. However, even though the above methods are simply used, it might not be possible to adequately control the content of the organic acids to the specified range. The limited content of the organic acids can be accomplished by appropriately selecting various conditions such as temperature, water amount, treating time, amount and mixing method of coagulating agent, stirring method and alkali concentration which are used in the coagulation step and alkali treatment.

Further, the oligomers are produced during the graft polymerization of the monomers to the component (A). These oligomers may also include dimers or trimers derived from the monomers used upon the polymerization, or those separately produced by the polymerization of the above monomers and then blended in the component (A).

In order to control the content of the oligomers to the above-specified preferred range, there may be used a method of lowering the temperature used upon the polymerization, a method of approaching the reaction system to azeotropic composition, or the like. The effect of limiting the oligomer content can be more effectively attained by conducting the production of the component (A) by catalyzed polymerization method rather than by thermal polymerization method.

The flame retardant thermoplastic resin composition of the present invention may contain, if required, fillers such as glass fibers, carbon fibers, wollastonite, talc, mica, kaolin, glass beads, glass flakes, milled fibers, zinc oxide whiskers and potassium titanate whiskers. These fillers may be used alone or in the form of a mixture of any two or more thereof. When these fillers are blended in the flame retardant thermoplastic resin composition of the present invention, it is possible to impart a good stiffness thereto. Especially, when talc or the like is blended in the flame retardant thermoplastic resin composition of the present invention, it is possible to impart a good delustering property thereto.

The flame retardant thermoplastic resin composition of the present invention may further contain various additives such as flame retardants such as antimony compounds, known coupling agents, antibacterial agents, mildew-proofing agents, antioxidants, weather (light) resisting agents, plasticizers, colorants (such as pigments and dyes) and anti-static agents, unless the addition thereof adversely affects the required performance of the resin composition.

Further, the flame retardant thermoplastic resin composition of the present invention may be blended with the other polymers or copolymers according to the required performance thereof. As the other polymers or copolymers blended, there may be exemplified polyamides, polyesters, polysulfones, polyether sulfones, polyphenylene sulfide, liquid crystal polymers, polyvinylidene fluoride, styrene-vinyl acetate copolymers, polyamide elastomers, polyamideimide elastomers, polyester elastomers, phenol resins, epoxy resins, novolak resins or the like.

The flame retardant thermoplastic resin composition of the present invention can be obtained by kneading the respective components with each other using various extruders, banbury mixer, kneader, rolls, feederuder or the like. Among them, the use of extruders or banbury mixer is preferred. Upon kneading, the respective components may be added at one batch or in several parts. The kneading procedure may be conducted using a multi-stage feed type extruder. Alternatively, after the components are kneaded together by banbury mixer, kneader or the like, the kneaded material may be pelletized using an extruder.

The thus obtained flame retardant thermoplastic resin composition of the present invention may be shaped or molded into various products by injection molding, sheet extrusion, vacuum forming, profile extrusion molding, foaming, injection press, press molding, blow molding or the like.

Various molded products produced by the above molding methods are excellent in impact resistance, heat resistance, fluidity, flame retardance and extrusion-production stability, and can be used in various applications such as office automation devices, domestic electric appliances, electric, electronic and telecommunication apparatuses, computers, sundries, sanitary goods, vehicles or the like.

Also, since the flame retardant thermoplastic resin composition of the present invention is excellent in extrusion-production stability, a molded product produced therefrom can satisfy a V-0-rated flame-retardant property by the UL-94 test and excellent Izod impact strength and falling weight impact strength, simultaneously. The falling weight impact strength of the molded product is in the range of preferably 300 to 550 kgf-mm, more preferably 350 to 520 kgf-mm, especially preferably 380 to 500 kgf-mm. Also, the heat-deformation temperature of the molded products as an index of heat resistance thereof is in the range of preferably 85 to 100° C., more preferably 85 to 95° C., especially preferably 88 to 95° C.

As described above, the flame retardant thermoplastic resin composition of the present invention is a non-halogen-based composition, and excellent in impact resistance, heat resistance, fluidity, flame retardance and extrusion-production stability. In addition, molded products produced from the composition of the present invention can be suitably used in various applications such as office automation devices, domestic electric appliances, electric, electronic and telecommunication apparatuses, computers, sundries, sanitary goods, vehicles or the like.

EXAMPLES

The present invention will be described in more detail by reference to the following examples. However, these examples are only illustrative and not intended to limit the present invention thereto.

Meanwhile, in Examples, Comparative Examples and Reference Examples, "part" and "%" represent "part by weight" and "% by weight", respectively, unless otherwise specified.

Evaluation methods:

Various properties were measured and evaluated by the following methods.

(1) Particle Size of Rubber Polymer:

The particle size of the rubber polymer was measured by electron microscope and image analysis. Meanwhile, when the rubber polymer used was latex, it was first observed and confirmed by electron microscope that the particle size of the latex previously produced in emulsified state was identical to that of particles dispersed in the rubber-reinforced resin. Then, the particle size of dispersed particles in the latex was measured by light-scattering method. More specifically, the measurement of the particle size was conducted by a cumulant method at a cumulative number of 70 using a laser particle size analyzing system LPA-3100 manufactured by Ohtsuka Denshi Co., Ltd.

(2) Gel Fraction (Content of Toluene-Insoluble Component):

The gel fraction was measured by the method as described above in the present specification.

(3) Graft Percentage:

The graft percentage was also measured by the method as described above in the present specification.

(4) Intrinsic Viscosity [η]:

The intrinsic viscosity of the methyl ethyl ketone-soluble component is determined by adding 1 g of the component (A) into 20 ml of methyl ethyl ketone, shaking the resultant mixture at room temperature for 2 hours using a shaker to dissolve the liberated polymers or copolymers in methyl ethyl ketone, centrifuging the obtained solution using a centrifugal separator at a rotating speed of 15,000 rpm for 30 minutes to separate an insoluble component from a soluble component; and then after drying, measuring the intrinsic viscosity of the thus separated soluble component. The thus separated soluble component was sufficiently dried by a vacuum dryer. The dried soluble component was dissolved in methyl ethyl ketone to prepare five solutions having different concentrations. The reduced viscosities of the respective five solutions were measured at 30° C. by Ubbellode viscometer. The intrinsic viscosities [η] (unit: dl/g) was calculated from the thus measured viscosities.

(5) Content of Organic Acids:

The flame retardant thermoplastic resin composition was dissolved in a solvent (1,4-dioxane) to prepare a solution. The organic acids contained in the solution were methyl-esterified with diazomethane, and the obtained methyl ester was measured using a gas chromatograph equipped with a hydrogen flame ionization detector to determine the content (%) of the organic acids.

(6) Content of Oligomers:

The flame retardant thermoplastic resin composition was dissolved in methyl ethyl ketone to prepare a solution. The polymer components contained in the solution were reprecipitated therefrom using n-pentane, and then the obtained supernatant was analyzed by a gas chromatography to measure a total amount of dimers and trimers contained therein, thereby determining the content (%) of the oligomers.

(7) Viscosity-Average Molecular Weight:

The aromatic polycarbonate was dissolved in methylene chloride to prepare five solutions having different concentrations. The reduced viscosities of the respective five solutions were measured at 20° C. by Ubbellode viscometer to determine intrinsic viscosities of the respective solutions. The viscosity-average molecular weight was calculated from the thus obtained intrinsic viscosities according to Mark-Houwink equation in which Mark-Houwink constants K and a were $1.23 \times 10^{-4}$ and 0.83, respectively.

(8) Impact Resistance (Izod Impact Strength):

A test specimen No. 2 according to JIS K7110 was produced using an injection-molding machine J100E-C5 manufactured by Nippon Seikosho Co., Ltd., by setting cylinder temperature and mold temperature thereof to 220° C. and 50° C., respectively, and tested to measure an Izod impact strength (unit: kgf-cm/cm) thereof.

(9) Heat Deformation Temperature (HDT):

A test specimen having a size of 12.8 mm in width×12.8 mm in height×128 mm in length, was tested under a bending stress of 18.5 kgf/cm$^2$ according to JIS K7207 to measure a heat deformation temperature (° C.) thereof.

(10) Fluidity (Melt Flow Rate: MFR):

The melt flow rate (unit: g/10 minutes) was measured at 240° C. under a load of 98N according to JIS K7210.

(11) Falling Weight Impact Strength:

The breaking energy of a test specimen having a size of 50 mm in width×80 mm in length×2.4 mm in thickness was measured using a high-speed impact tester "SERVO-PULSER EHF-2H-20L" manufactured by Shimadzu Corporation. The measuring conditions were as follows: Specimen pedestal diameter: 30 mmφ; Striking bar tip: 12.7 mmR; Striking speed: 3.1 m/s. The unit of the falling weight impact strength is "kgf-mm".

(12) Evaluation of Burning Property (Flame Retardance):

A test specimen having a size of 127 mm in length×12.7 mm in width×2.5 mm in thickness was subjected to vertical burning test by the method prescribed in UL94 standard. In the evaluation results of the vertical burning test, "V-0" represents a "V-0"-acceptable rating, "BN" represents "burning", i.e., a "V-0"-unacceptable rating, and "D" represents an unacceptable dripping rating.

(13) Extrusion-Production Stability:

The resin composition was pelletized using an extruder "NVC50" manufactured by Nakatani Kikai Co., Ltd. by setting the cylinder temperature to 220° C. The extrusion-production stability was evaluated according to the following criteria.

Good: Stable extrusion production was possible; and

Not good: Extrusion of strands was interrupted at opposite end orifices of extrusion die Reference Example 1

(Preparation of Rubber Polymer)

As rubber polymers (a) to (c), there were used the following polybutadiene latexes as shown in Table 1 below.

TABLE 1

| Rubber polymer | (a) | (b) | (c) |
|---|---|---|---|
| Polybutadiene latex | | | |
| Particle size distribution (%) (d = particle size) | | | |
| d ≦ 150 nm | 12 | 48 | 13 |
| 150 nm < d < 350 nm | 80 | 49 | 38 |
| d ≧ 350 nm | 8 | 3 | 49 |
| Gel fraction (%) | 78 | 82 | 69 |

Reference Example 2

(Preparation of Component (A))

The rubber polymers (a) to (c) were respectively emulsion-polymerized with styrene and acrylonitrile as the monomer components at mixing ratios shown in Table 2, thereby obtaining graft copolymers (A-1) to (A-2) and (A'-1) to (A'-6) having different graft percentages. Separately, only the monomer components were solution-polymerized with each other at mixing ratios shown in Table 2, thereby obtaining a copolymer (a-1). The properties of the thus obtained graft copolymers and copolymer are shown in Table 2.

TABLE 2

| Kind of graft copolymer | Rubber polymer Kind | Rubber polymer Amount (wt. part) | Amounts of monomers (wt. part) Styrene | Amounts of monomers (wt. part) Acrylonitrile |
|---|---|---|---|---|
| A-1 | (a) | 30 | 49 | 21 |
| A-2 | (a) | 40 | 42 | 18 |
| A'-1 | (a) | 50 | 35 | 15 |
| A'-2 | (a) | 30 | 49 | 21 |
| A'-3 | (b) | 30 | 49 | 21 |
| A'-4 | (b) | 40 | 42 | 18 |
| A'-5 | (c) | 30 | 49 | 21 |
| A'-6 | (c) | 40 | 42 | 18 |
| a-1 | — | — | 70 | 30 |

| Kind of graft copolymer | Graft percentage (%) | Intrinsic viscosity [η] (dl/g) | Content of organic acids (wt. part) | Content of oligomers (wt. part) |
|---|---|---|---|---|
| A-1 | 115 | 0.43 | 1.2 | <0.1 |
| A-2 | 69 | 0.45 | 1.8 | <0.1 |
| A'-1 | 48 | 0.46 | 1.5 | <0.1 |
| A'-2 | 135 | 0.42 | 1.5 | <0.1 |
| A'-3 | 105 | 0.44 | 1.2 | <0.1 |
| A'-4 | 80 | 0.45 | 1.0 | <0.1 |
| A'-5 | 102 | 0.43 | 1.8 | <0.1 |
| A'-6 | 83 | 0.45 | 1.2 | <0.1 |
| a-1 | — | 0.56 | 0 | 1.2 |

Reference Example 3

(Preparation of Aromatic Polycarbonate as Component (B))

The following aromatic polycarbonates (B-1) to (B-3) and (B'-1) to (B'-2) were used as the components (B).

(B-1): Polycarbonate having a viscosity-average molecular weight of 18,000;

(B-2): Polycarbonate having a viscosity-average molecular weight of 23,000;

(B-3): Polycarbonate having a viscosity-average molecular weight of 28,000;

(B'-1): Polycarbonate having a viscosity-average molecular weight of 15,000; and (B'-2): Polycarbonate having a viscosity-average molecular weight of 31,000.

Reference Example 4

(Preparation of Phosphate Compound as Component (C))

The following phosphates (C-1) to (C-3) and (C'-1) to (C'-2) were used as the component (C).

(C-1): Phosphate compound represented by the above general formula (I) wherein $R^1$ to $R^4$ are phenyl; X is 2,2-bis(41-phenylene)propane; and n is 1.1.

(C-2): Phosphate compound represented by the above general formula (I) wherein $R^1$ to $R^4$ are 2,6-xylenyl; X is m-phenylene; and n is 1.0.

(C-3): Phosphate compound represented by the above general formula (I) wherein $R^1$ to $R^4$ are phenyl; X is 2,2-bis(4'-phenylene)propane; and n is 0.6.

(C'-1): Triphenyl phosphate represented by the above general formula (I) wherein $R^1$ to $R^4$ are phenyl; and n is 0.

(C'-2): Phosphate compound represented by the above general formula (I) wherein $R^1$ to $R^4$ are phenyl; X is 2,2-bis(4'-phenylene)propane; and n is 0.3.

Reference Example 5

(Preparation of Component (D))

The following compositions (D-1) to (D-4) and (D'-1) to (D'-2) were prepared by blending "PHOSTAFRON TF1620" (tradename; produced by Dainion Co., Ltd.; average particle size: 220 μm; particle size distribution: content of particles having a particle size of not less than 600 μm: not more than 25% by weight; bulk density: 850 g/l; melting point: 327° C.; specific gravity: 2.15; number-average molecular weight: 7,000,000) as the component (d1), with hardened castor oil waxes as the component (d2).

(D-1): Composition prepared by mixing 50 parts of (d1) with 50 parts of (d2) for 5 minutes using a Henschel mixer;

(D-2): Composition prepared by mixing 20 parts of (d1) with 80 parts of (d2) for 5 minutes using a Henschel mixer;

(D-3): Composition prepared by mixing 70 parts of (d1) with 30 parts of (d2) for 5 minutes using a Henschel mixer;

(D-4): Composition prepared by mixing 50 parts of (d1) with 50 parts of (d2) for 5 minutes using a Henschel mixer; and (D'-1): Composition prepared by mixing 80 parts of (d1) with 20 parts of (d2) for 5 minutes using a Henschel mixer.

Examples 1 to 11 and Comparative Examples 1 to 13

The respective components were mixed together for 3 minutes at mixing ratios shown in Tables 3 to 6 using a Henschel mixer. Then, the resultant mixture was melt-extruded from an NVC-type 50-mm vented extruder manufactured by Nakatani Kikai Co., Ltd., by setting the cylinder temperature to 220 to 250° C., thereby obtaining pellets. The thus obtained pellets were sufficiently dried, and then injection-molded using an injection molding machine J100E-C5 manufactured by Nippon Seikosho Co., Ltd., by setting the cylinder temperature and mold temperature to 240° C. and 50° C., respectively, thereby obtaining test specimens for various evaluation tests. The test specimens were tested by the above evaluation methods. The results are shown in Tables 3 to 6.

TABLE 3

| | Ex. 1 | Ex. 2 | Ex. 3 | Ex. 4 | Ex. 5 | Ex. 6 |
|---|---|---|---|---|---|---|
| Composition (wt. part) | | | | | | |
| Component (A) | | | | | | |
| (A-1) | 20 | | 20 | 20 | | |
| (A-2) | | 15 | | | 15 | 15 |
| (a-1) | | 5 | | | 5 | 5 |
| Component (B) | | | | | | |
| (B-1) | | | 80 | | | |
| (B-2) | 80 | 80 | | | 80 | 80 |
| (B-3) | | | | 80 | | |
| Component (C) | | | | | | |
| (C-1) (n = 1.1) | 15 | 15 | 15 | 15 | | |
| (C-2) (n = 1.0) | | | | | 15 | |
| (C-3) (n = 0.6) | | | | | | 15 |
| (C-4) (n = 0) | | | | | | |
| (C-5) (n = 0.3) | | | | | | |
| Component (D) | | | | | | |
| (D-1) | 0.3 | 0.3 | 0.3 | 0.3 | 0.3 | 0.3 |

TABLE 3-continued

|  | Ex. 1 | Ex. 2 | Ex. 3 | Ex. 4 | Ex. 5 | Ex. 6 |
|---|---|---|---|---|---|---|
| Evaluation results |  |  |  |  |  |  |
| Izod impact strength (kgf-cm/cm) | 55 | 52 | 45 | 68 | 35 | 61 |
| Heat deformation temperature (° C.) | 91 | 91 | 89 | 91 | 94 | 89 |
| Fluidity (g/10 min.) | 61 | 66 | 85 | 42 | 31 | 49 |
| Falling weight impact strength (kgf-mm) | 490 | 450 | 390 | 480 | 460 | 450 |
| Burning property | V-0 | V-0 | V-0 | V-0 | V-0 | BN |
| Extrusion-production stability | Good | Good | Good | Good | Good | Good |

TABLE 4

|  | Ex. 7 | Ex. 8 | Ex. 9 | Ex. 10 | Ex. 11 |
|---|---|---|---|---|---|
| Composition (wt. part) |  |  |  |  |  |
| Component (A) |  |  |  |  |  |
| (A-1) | 15 | 20 | 20 | 20 | 20 |
| (A-2) |  | 15 |  |  |  |
| (a-1) |  |  | 5 |  |  |
| Component (B) |  |  |  |  |  |
| (B-1) |  |  |  |  |  |
| (B-2) | 85 | 80 | 80 | 80 | 80 |
| Component (C) |  |  |  |  |  |
| (C-1) (n = 1.1) |  |  |  |  |  |
| (C-2) (n = 1.0) | 10 | 20 | 15 | 15 | 15 |
| (C-3) (n = 0.6) |  |  |  |  |  |
| Component (D) |  |  |  |  |  |
| (D-1) | 0.5 | 0.3 |  |  |  |
| (D-2) |  |  |  | 2 |  |
| (D-3) |  |  | 0.1 |  |  |
| (D-4) |  |  |  |  | 0.3 |
| Evaluation results |  |  |  |  |  |
| Izod impact strength (kgf-cm/cm) | 62 | 68 | 58 | 51 | 52 |
| Heat deformation temperature (° C.) | 93 | 91 | 92 | 90 | 93 |
| Fluidity (g/10 min.) | 55 | 42 | 58 | 65 | 58 |
| Failing weight impact strength (kgf-mm) | 390 | 480 | 430 | 400 | 450 |
| Burning property | V-0 | V-0 | V-0 | V-0 | V-0 |
| Extrusion production stability | Good | Good | Good | Good | Good |

TABLE 5

|  | Com. Ex.1 | Com. Ex.2 | Com. Ex.3 | Com. Ex.4 | Com. Ex.5 | Com. Ex.6 |
|---|---|---|---|---|---|---|
| Composition (wt. part) |  |  |  |  |  |  |
| Component (A) |  |  |  |  |  |  |
| (A-1) |  |  |  |  | 5 |  |
| (A-2) |  |  |  |  |  | 45 |
| (A'-1) |  |  |  |  |  |  |
| (A'-2) |  |  |  |  |  |  |
| (A'-3) | 20 |  |  |  |  |  |
| (A'-4) |  | 15 |  |  |  |  |
| (A'-5) |  |  | 20 |  |  |  |
| (A'-6) |  |  |  | 15 |  |  |
| (a-1) |  |  | 5 | 5 |  |  |
| Component (B) |  |  |  |  |  |  |
| (B-1) |  |  |  |  | 95 |  |
| (B-2) | 80 | 80 | 80 | 80 |  | 55 |
| (B'-1) |  |  |  |  |  |  |
| (B'-2) |  |  |  |  |  |  |
| Component (C) |  |  |  |  |  |  |
| (C-1) (n = 1.1) | 15 | 15 | 15 | 15 | 13 | 15 |
| (C-2) (n = 1.0) |  |  |  |  |  |  |
| (C-3) (n = 0.6) |  |  |  |  |  |  |
| (C'-1) (n = 0) |  |  |  |  |  |  |
| (C'-2) (n = 0.3) |  |  |  |  |  |  |
| Component (D) |  |  |  |  |  |  |
| (D-1) | 0.3 | 0.3 | 0.3 | 0.3 | 0.3 | 0.3 |
| (D'-1) |  |  |  |  |  |  |
| (D'-2) |  |  |  |  |  |  |
| Evaluation results |  |  |  |  |  |  |
| Izod impact strength (kgf-cm/cm) | 48 | 47 | 51 | 56 | 46 | 61 |
| Heat deformation temperature (° C.) | 92 | 91 | 92 | 91 | 96 | 89 |
| Fluidity (g/10 min.) | 70 | 67 | 59 | 54 | 19 | 49 |
| Falling weight impact strength (kgf-mm) | 190 | 170 | 140 | 210 | 460 | 450 |
| Burning property | V-0 | V-0 | BN | BN | V-0 | BN |
| Extrusion production stability | Good | Good | Good | Good | Good | Good |

TABLE 6

|  | Com. Ex.7 | Com. Ex.8 | Com. Ex.9 | Com. Ex.10 | Com. Ex.11 | Com. Ex.12 | Com. Ex.13 |
|---|---|---|---|---|---|---|---|
| Composition (wt. part) |  |  |  |  |  |  |  |
| Component (A) |  |  |  |  |  |  |  |
| (A-1) | 20 |  | 20 | 20 | 15 | 20 | 20 |
| (A-2) |  | 20 |  |  |  |  |  |
| (A'-1) |  |  |  |  |  |  |  |
| (A'-2) |  |  |  |  |  |  |  |
| (A'-3) |  |  |  |  |  |  |  |
| (A'-4) |  |  |  |  |  |  |  |
| (A'-5) |  |  |  |  |  |  |  |
| (A'-6) |  |  |  |  |  |  |  |
| (a-1) |  |  |  |  |  |  |  |
| Component (B) |  |  |  |  |  |  |  |
| (B-1) |  |  |  |  |  |  |  |
| (B-2) |  |  | 80 | 80 | 85 | 80 | 80 |
| (B'-1) | 80 |  |  |  |  |  |  |
| (B'-2) |  | 80 |  |  |  |  |  |
| Component (C) |  |  |  |  |  |  |  |
| (C-1) (n = 1.1) | 15 | 15 |  |  |  |  |  |
| (C-2) (n = 1.0) |  |  |  |  | 5 |  | 15 |
| (C-3) (n = 0.6) |  |  |  |  |  | 30 |  |
| (C'-1) (n = 0) |  |  | 20 |  |  |  |  |
| (C'-2) (n = 0.3) |  |  |  | 20 |  |  |  |
| Component (D) |  |  |  |  |  |  |  |
| (D-1) | 0.3 | 0.3 | 0.3 | 0.3 | 0.5 | 0.3 |  |
| (D'-1) |  |  |  |  |  |  | 0.4 |
| (D'-2) |  |  |  |  |  |  |  |

TABLE 6-continued

|  | Com. Ex.7 | Com. Ex.8 | Com. Ex.9 | Com. Ex.10 | Com. Ex.11 | Com. Ex.12 | Com. Ex.13 |
|---|---|---|---|---|---|---|---|
| Evaluation results |  |  |  |  |  |  |  |
| Izod impact strength (kgf-cm/cm) | 21 | 66 | 21 | 66 | 59 | 62 | 41 |
| Heat deformation temperature (° C.) | 90 | 93 | 76 | 78 | 96 | 79 | 91 |
| Fluidity (g/10 min.) | 98 | 9 | 98 | 12 | 47 | 109 | 52 |
| Falling weight impact strength (kgf-mm) | 140 | 520 | 140 | 520 | 420 | 430 | 210 |
| Burning property | V-0 | V-0 | V-0 | V-0 | BN | V-0 | D |
| Extrusion production stability | Good | Good | Good | Good | Good | Good | Not-good |

As is apparent from the results of Examples 1 to 11 shown in Tables 3 to 6, the flame retardant thermoplastic resin compositions of the present invention all were excellent in impact resistance, heat resistance, fluidity, flame retardance and extrusion-production property.

On the other hand, as is apparent from Tables 5 and 6, the resin compositions obtained in Comparative Examples 1 and 2 in which the content of the rubber polymer particles having a particle size of not more than 150 nm in the component (A) was increased out of the range defined by the present invention, were deteriorated in falling weight impact strength. The resin compositions obtained in Comparative Examples 3 and 4 in which the content of the rubber polymer particles having a particle size of not less than 350 nm in the component (A) was increased out of the range defined by the present invention, were deteriorated in falling weight impact strength and flame retardance. The resin composition obtained in Comparative Example 5 in which the amount of the component (A) blended was reduced out of the range defined by the present invention and the amount of the component (B) blended was increased out of the range defined by the present invention, was deteriorated in fluidity. The resin composition obtained in Comparative Example 6 in which the amount of the component (A) blended was increased out of the range defined by the present invention and the amount of the component (B) blended was reduced out of the range defined by the present invention, was deteriorated in flame retardance.

The resin composition obtained in Comparative Example 7 in which the viscosity-average molecular weight of the component (B) was reduced out of the range defined by the present invention, was deteriorated in falling weight impact strength. The resin composition obtained in Comparative Example 8 in which the viscosity-average molecular weight of the component (B) was increased out of the range defined by the present invention, was deteriorated in fluidity. The resin compositions obtained in Comparative Examples 9 and 10 in which the polymerization degree of the component (C) was reduced out of the range defined by the present invention, were deteriorated in heat resistance. The resin composition obtained in Comparative Example 11 in which the amount of the component (C) blended was reduced out of the range defined by the present invention, was deteriorated in flame retardance. The resin composition obtained in Comparative Example 12 in which the amount of the component (C) blended was increased out of the range defined by the present invention, was deteriorated in heat resistance. The resin composition obtained in Comparative Example 13 in which the blending ratio of (d1) to (d2) in the component (D) was reduced, i.e., the amount of (d1) was increased and the amount of (d2) was reduced out of the range defined by the present invention, was deteriorated in falling weight impact strength, flame retardance and extrusion-production stability.

What is claimed is:

1. A flame retardant thermoplastic resin composition comprising:

(A) 10 to 40 parts by weight of a rubber-reinforced resin produced by graft-polymerizing a monomer component containing an aromatic vinyl compound and a vinyl cyanide compound as main ingredients in the presence of a rubber polymer comprising particles having a particle size of not more than 150 nm in an amount of 0 to 15% by weight, particles having a particle size of from more than 150 to less than 350 nm in an amount of 60 to 100% by weight and particles having a particle size of not less than 350 nm in an amount of 0 to 25% by weight; and (B) 90 to 60 parts by weight of an aromatic polycarbonate having a viscosity-average molecular weight of 16,000 to 30,000, with the proviso that the total amount of the components (A) and (B) is 100 parts by weight;

said composition further comprising:

(C) a phosphate compound represented by the general formula (I):

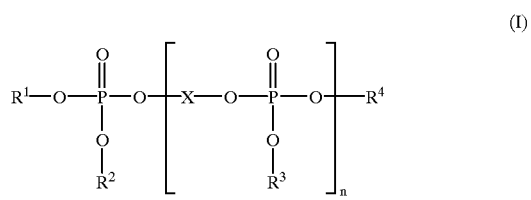

(I)

wherein $R^1$, $R^2$, $R^3$ and $R^4$ are independently phenyl group or xylenyl group; X is m-phenylene group or 2,2-bis(4'-phenylene)propane group; and n is 0.5 to 1.2, in an amount of 8 to 25 parts by weight based on 100 parts by weight of the sum of said components (A) and (B); and (D) a component comprising 10 to 70% by weight of polytetrafluoroethylene (d1) and 90 to 30% by weight of a lubricant (d2), which are previously blended to form a mixture before use, with the proviso that the total amount of (d1) and (d2) is 100% by weight, in an amount of 0.1 to 10 parts by weight based on 100 parts by weight of the sum of said components (A) and (B).

2. A flame retardant thermoplastic resin composition according to claim 1, wherein $R^1$, $R^2$, $R^3$ and $R^4$ of the general formula (I) are xylenyl group, and X thereof is m-phenylene group.

3. A flame retardant thermoplastic resin composition according to claim 1, further comprising a component (B) comprising organic acids and/or oligomers.

4. A flame retardant thermoplastic resin composition according to claim 1, wherein said polytetrafluoroethylene (d1) has an average particle size of 100 to 700 μm.

5. A flame retardant thermoplastic resin composition according to claim 1, wherein said polytetrafluoroethylene (d1) has a bulk density of 100 to 1,000 g/l.

6. A flame retardant thermoplastic resin composition according to claim 1, wherein said polytetrafluoroethylene (d1) has a melting point of 250 to 350° C.

7. A flame retardant thermoplastic resin composition according to claim 1, wherein said polytetrafluoroethylene (d1) has a specific gravity of 1.8 to 2.5.

8. A flame retardant thermoplastic resin composition according to claim 1, wherein said lubricant (d2) is hydrocarbons, aliphatic compounds, esters, or higher alcohols.

9. A flame retardant thermoplastic resin composition according to claim 1, wherein said lubricant (d2) has a melting point of 40 to 150° C.

* * * * *